United States Patent [19]

Amanrich

[11] 3,956,465

[45] May 11, 1976

[54] SOLVENT PURIFICATION OF WET PROCESS PHOSPHORIC ACID

[75] Inventor: Robert Amanrich, Toulouse, France

[73] Assignee: Azote et Produits Chimiques S.A., Toulouse, France

[22] Filed: Feb. 7, 1974

[21] Appl. No.: 440,333

Related U.S. Application Data

[63] Continuation of Ser. No. 151,504, June 9, 1971, abandoned.

[30] Foreign Application Priority Data

June 12, 1970 France .............................. 70.21581
Mar. 10, 1971 France .............................. 71.08242

[52] U.S. Cl. .............................. 423/321 S; 423/320; 423/313
[51] Int. Cl.² .................. B01D 11/04; C01B 25/22; C01B 25/30
[58] Field of Search ................ 423/321 S, 320, 313; 23/293 R; 203/43

[56] References Cited
UNITED STATES PATENTS

| | | | |
|---|---|---|---|
| 1,838,431 | 12/1931 | Milligan | 423/321 S |
| 1,857,470 | 5/1932 | Milligan | 423/321 S |
| 3,298,782 | 1/1967 | Archambault | 423/321 S |
| 3,366,448 | 1/1968 | Martin | 423/321 S |
| 3,367,738 | 2/1968 | Schallert | 423/321 S |
| 3,388,967 | 6/1968 | Ramaradhya | 423/321 S |
| 3,397,955 | 8/1968 | Champ | 423/321 S |
| 3,497,329 | 2/1970 | Amanrich | 423/321 S |
| 3,529,932 | 9/1970 | Imoto | 423/321 S |

FOREIGN PATENTS OR APPLICATIONS

| | | | |
|---|---|---|---|
| 259,451 | 6/1962 | Canada | 423/321 S |
| 1,020,071 | 2/1966 | United Kingdom | 423/321 S |
| 1,292,338 | 3/1962 | France | 423/321 S |

*Primary Examiner*—Norman Yudkoff
*Assistant Examiner*—S. J. Emery
*Attorney, Agent, or Firm*—Millen, Raptes & White

[57] ABSTRACT

In the purification of wet process phosphoric acid by solvent extraction, there is employed an organic solvent partially miscible with water, e.g. isobutanol. By using such a solvent containing about 40 to 50 % less than the saturation level of dissolvable water, the rate of extraction is improved and the formation of gels is avoided. It is preferred that the temperature during the extraction state be maintained substantially constant.

11 Claims, No Drawings

SOLVENT PURIFICATION OF WET PROCESS PHOSPHORIC ACID

This is a continuation of application Ser. No. 151,504, filed June 9, 1971, now abandoned.

BACKGROUND OF THE INVENTION

This invention relates to the purification of phosphoric acid by solvent extraction and, in particular, to the purification of wet process phosphoric acid.

In the so-called wet process, phosphate rock and sulfuric acid are reacted to form gypsum, hydrogen fluoride, and orthophosphoric acid, an example of such a process being described in Faith, Keyes and Clark Industrial Chemical, Third Edition, Wiley & Sons, 1965, pages 603–605. In many cases, the resultant phosphoric acid, often called green acid, must be purified in order to eliminate undesirable metallic impurities, especially when the phosphoric acid is used in the food and detergent industries. The impurities normally found in green acid are compounds of silicon, fluorine, calcium, arsenic, iron, aluminum, chromium, vanadium, lead and other metals in lower amounts.

It is old in the art to purify green acid by solvent extraction with an organic solvent which is either immiscible or partially miscible with water. In both cases, a two-phase system is obtained, the major portion of the phosphoric acid being dissolved in the organic phase, and the major portion of the impurities being dissolved in the aqueous phase. The two phases are then separated conventionally, by decantation, for example. In this connection, attention is invited in particular to German Patent No. 884,358, dated July 27, 1953.

Irrespective of the specific solvent extraction technique employed heretofore, a significant quantity of the phosphoric acid remained in the aqueous solution containing the impurities, the amount of phosphoric acid remaining being inversely proportional to the concentration of the green acid treated. Consequently, the yield of recovered $P_2O_5$ decreased as the concentration of the treated acid decreased. For example, from green acids having a concentration of only 3 % of $P_2O_5$, not more than 80 – 90 % of the $P_2O_5$ can be recovered.

In an effort to circumvent the above disadvantage, it has been proposed to add sulfuric or hydrofluoric acid to the phosphoric acid. However, the added acid must then be separated from the phosphoric acid in a subsequent step, this being especially troublesome when the added acid is not volatile. It has also been suggested to add salts, such as sodium fluoride. However, these salts must be sufficiently pure, or else the impurities associated therewith can end up in the phosphoric acid product. Thus, if a salt is to be used, it must be recovered from the aqueous phase, purified, and then recycled, such steps resulting in an unduly complex and expensive process.

SUMMARY OF THE INVENTION

In view of the above problems associated with the purification of wet process phosphoric acids, it is an object of this invention to provide an improved process which is relatively more economic and less troublesome than prior art techniques.

A particular object of the invention is to provide an improved solvent extraction process wherein the organic solvent contains a predetermined concentration of water before it is used for extraction purposes.

As another object of the invention, there is provided as interrelated process wherein the phosphoric acid is recovered from the organic phase in a manner which leaves the organic solvent in a condition to be recycled directly to the extraction step.

Upon further study of the specification and appended claims, further objects and advantages of the invention will be apparent.

To attain the above objects, there is provided a solvent extraction process wherein the green phosphoric acid is extracted with an organic solvent which is partially miscible with water, and in particular, contains 40 – 50 % less than the water required to saturate the solvent. For example, if a solvent is saturated with 10 g. of water, there is used in the present invention the same solvent containing only 6 to 5 g. of water. The saturation value is measured at approximately the average temperature of the extraction process.

A wide variety of partially miscible organic solvents can be employed. The criteria for such solvents are:

1. they must be liquid at room temperature;
2. they do not form compounds or complexes with phosphoric acid which are not dissociated in the subsequent phosphoric acid recovery step wherein phosphoric acid is separated from the organic phase by aqueous extraction of neutralization or the like; and
3. the solvents must be miscible with water at 25°C to the extent that a saturated mixture of water and solvent contains 2 – 30 % by weight of water.

The preferred solvents meeting these criteria include but are not limited to: aliphatic saturated alcohols containing 4 –10 carbon atoms, cyclopentanol, cyclohexanol, benzyl alcohol, ethyl acetate, isopropyl acetate, cyclohexanone, tri-butyl phosphate and phenyl ethyl alcohol.

Numerous other solvents can be selected by reference to chemical handbooks, Seidel's Treatise on Solvents, etc. Furthermore, it is merely a matter of routine experimentation to determine solvents which qualify under the above criteria even if newly synthesized compounds.

It has been unexpectedly discovered that the distribution coefficient of phosphoric acid ($KP_2O_5$), i.e., the ration of the concentration in phosphoric acid in the organic phase and that in the aqueous phase, increases substantially as the content of water in the solvent decreases, until the solvent contains about 40 to 50 % less than the water corresponding to that of saturation. For lower concentrations of water, the distribution coefficient increases insignificantly, if at all, and as the solvent approaches the anhydrous state, the resultant solvent — phosphoric acid mixture becomes less fluid to the point of gelation. Accordingly, a water concentration of 40 — 50 % less than saturation is unexpectedly superior with respect to both the $P_2O_5$-distribution and rheological aspects.

DETAILED DESCRIPTION OF THE INVENTION

Table I below shows the variation of $KP_2O_5$ according to the content of water in the solvent when the solvent is isobutanol or ethylbutanol. The tests were performed at 25°C by mixing phosphoric acid with five times its weight of solvent, separating the organic phase from the aqueous phase by decantation, and by determining the quantity of phosphoric acid in the aqueous phase and in the organic phase.

TABLE I

| %P$_2$O$_5$ in the treated acid | KP$_2$O$_5$ isobutanol 16% water | KP$_2$O$_5$ isobutanol 8% water | KP$_2$O$_5$ isobutanol 4% water | KP$_2$O$_5$ anhydrous isobutanol |
|---|---|---|---|---|
| 10 | 0.06 | 0.14 | 0.14 | 0.14 |
| 5 | 0.05 | 0.12 | 0.14 | 0.12 |
| | ethylbutanol 4.5% water | ethylbutanol 2% water | anhydrous ethylbutanol | |
| 10 | 0.020 | 0.040 | 0.045 | |
| 5 | 0.017 | 0.036 | 0.036 | |

From the above table, it is seen that the improvement of the distribution coefficient is more significant with weaker concentrations of the treated phosphoric acid. Table II below shows the variations of KP$_2$O$_3$, using isobutanol saturated and unsaturated with water for different concentrations of P$_2$O$_5$ in the treated phosphoric acid. The tests were performed under the same conditions as Table I.

TABLE II

| %P$_2$O$_5$ in the treated acid | KP$_2$O$_5$ isobutanol saturated with water: (16% water) | KP$_2$O$_5$ isobutanol 8% water |
|---|---|---|
| 30 | 0.17 | 0.26 |
| 20 | 0.12 | 0.20 |
| 10 | 0.06 | 0.14 |
| 5 | 0.05 | 0.12 |

Table II demonstrates that the coefficient of distribution increases 53 % for an acid at 30 % of P$_2$O$_5$ and 140 % for an acid at 5 % of P$_2$O$_5$. Thus, the process of the present invention is particularly beneficial for the treatment of green acids which do not contain more than 10 % of P$_2$O$_5$, with extraction yields of at least 97 % being obtainable. Acids containing from 20 to 55 % of P$_2$O$_5$ obtained directly by wet process or having been submitted to a pre-concentration can also be advantageously treated, but to a lesser extent.

Solvents preferably used to purify the more concentrated phosphoric acids, i.e. 55 to 65 % by weight P$_2$O$_5$, are those when saturated with water, the mixture contains 2 to 10 % by weight of water at 25°C, e.g. for acids containing 50 – 55 % of P$_2$O$_5$ it is advantageous to use C$_5$ OXO alcohols, i.e. alcohols having 5 carbon atoms which are prepared by the Oxo process, which contain about 8 % of water at saturation (at 25°C) or ethylbutanol which contains about 5 % of water at saturation (at 25°C). Conversely, to purify the less concentrated acids, i.e., 10 to 20 % by weight P$_2$O$_5$, it is preferred to employ solvents containing about 20 to 30 % by weight of water (based on the mixture at 25°C) at saturation, e.g., to purify phosphoric acid containing 20 % of P$_2$O$_5$, tertiary amyl alcohol containing about 21 % of water at saturation (at 25°C) is advantageously utilized.

On another hand, as noted previously if an anhydrous solvent is used, a thickening or gelling of the raffinate occurs very often. This leads to difficulty in the extractor. Thus, the risks of thickening decrease as the water in the solvent increases to 50 to 40 % less than saturation water.

As a further precaution against gelling, it is preferred to maintain the temperature of the solvent at a substantially uniform value during the extraction so that it decreases no more than 2° C or increases no more than 5°C during the extraction. Indeed, it has been observed that the thickening of raffinate is related to the temperature variations of the solvent during the extraction. For instance, if a solvent, resulting from distillation or from a stage of neutralization, and having a temperature of about 40°C is recycled directly to green phosphoric acid at ambient temperature, this often results in a thickening of the raffinate. Similarly, the thickening or gelling of raffinate can be due to variations of the outside temperature; it has been noted, for example, that the raffinate thickens in winter or during the night when the outside temperature decreases to below 20°C. Likewise, there has been observed the thickening of raffinate in the summer when the extraction system is exposed to the sun.

Thus, the risks of thickening with the solvent according to the invention are practically nil when the temperature of the solvent decreases no more than 2°C during the extraction but for a greater decrease in temperature, the phenomenon of thickening reappears. Likewise, the temperature of the solvent can tolerate an increase of 5°C during extraction, but for a higher increase in temperature the risk of thickening increases.

To avoid rheological disturbances, a solvent and a green acid are preferably brought into contact at the same temperature. Variations in temperature can also be compensated for by heating the extractor (for example with immersed tubes) when the outside temperature drops or by cooling it when the outside temperature increases. The variations in temperature can also be reduced by insulating the extraction apparatus.

It must be noted that acceptable yields of extraction can be obtained at temperatures from 0° to 80° C, however, the extraction is preferably performed at room temperature (20° to 25° C).

To peform the extraction, wet process phosphoric acid is brought into contact (preferably countercurrently) with the organic solvent in an extractor; the organic extract is collected, the extract is optionally purified by washing with water; and then the organic extract is treated to separate phosphoric acid from organic solvent.

To recover the phosphoric acid from the organic extract, the latter is treated conventionally either with water to reextract phosphoric acid, or is neutralized by sodium hydroxide or sodium carbonate, potash or potassium carbonate or ammonia. The solvent is then separated by decantation from the aqueous phase containing either phosphoric acid or a dissolved phosphate. The solvent is then recycled to the extraction stage.

When phosphoric acid is reextracted with pure water, the solvent separated after decantation is always saturated with water. Before recycling, the water in the solvent must be partially removed by distillation or the like so as to comply with the partial saturation requirements of the invention.

If phosphoric acid is reextracted by neutralization, however, a part of the water contained in the organic phase is transferred to the aqueous phase and because of this transfer, there is separated a solvent not completely saturated with water. Thus, for the purification of phosphoric acid of a given concentration, by regulating the rate of recycling of the solvent and the temperature of decantation of the solvent, it is possible, by employing neutralization, to separate a solvent having exactly the same content in water as that of the solvent used for extraction and which can be recycled directly to the extraction stage. Consequently, it is usually advantageous to utilize the neutralization technique, thereby eliminating a distillation step.

For example, a phosphoric acid at 30 % of $P_2O_5$ is purified by extraction at 25° C with a $C_5$ OXO alcohol containing 6.25 % of water and a solvent/acid ratio of 23.6. Sodium hydroxide is then added to the so obtained organic extract in a sufficient quantity to neutralize the first acidity of the phosphoric acid. Then, by decantation at 25° C, an organic phase is separated comprising the solvent having 6.25 % by weight of water which is recycled directly to the extraction stage. By using as the solvent, tertiary amyl alcohol containing 9.25 % of water and a solvent/acid ratio of 3.0, the solvent with its initial content of water is recovered after neutralization with sodium hydroxide and decantation of the organic phase at 40° C. In both cases, the extraction rate is 97 – 98 %.

If it is desired to obtain a particularly pure acid, the green phosphoric acid can be treated conventionally before extraction, to eliminate $SO_4^=$ and $F^-$ ions. For instance, the green acid can be defluorinated by the addition of $NA_2CO_3$ or by the introduction of an entraining vapor, and $SO_4^=$ ions can be eliminated by the addition of raw phosphate.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Into a battery of 10 extractors there is introduced at 25° 3.32 t/h of wet process phosphoric acid having the following composition on a weight basis:

| | | | |
|---|---|---|---|
| $P_2O_5$ | 30.70% | $Fe_2O_3$ | 0.26% |
| F | 2.17% | $Al_2O_3$ | 0.43% |
| $SO_3$ | 1.34% | MgO | 0.33% |

At the other end of the battery, there is introduced countercurrently 26.6 t/h of recycled isobutanol containing 9.65 % of water, the temperature of which has been reduced by cooling at 25° C. From the system there is recovered 0.20 t/h of an aqueous solution containing the impurities, and 29.73 t/h of an extract. The latter is neutralized to 4.2 pH with 0.57 t/h of sodium hydroxide. 26.61 t/h of isobutanol having 9.65 % by weight of water (calculated at 25° C) are separated and recycled to the extraction stage. The aqueous phase recovered from the neutralization step is a solution of monosodium phosphate containing 27.5 % of $P_2O_5$. After evaporation of this solution, the resultant monosodium phosphate has the following composition:

| | | | |
|---|---|---|---|
| $P_2O_5$ | 58.8% | $SO_3$ | 2.4% |
| $Na_2O$ | 25.5% | $Al_2O_3$ | 10 ppm |
| F | 0.6% | MgO | 10 ppm |
| $Fe_2O_3$ | 0.012% | | |

The recovery rate of $P_2O_5$ in relation to the quantity introduced by the green phosphoric acid is 98 %.

EXAMPLE 2

One ton of raw 30 % phosphoric acid at 25° C is treated with 20 kg of sodium carbonate. The resultant precipitated fluosilicates are eliminated by filtration, the filtration cake being washed by 100 kg of water. One ton of defluorinated green acid filtrate is obtained containing about 0.1 % F; and 106 kg of washed precipitate remain.

This green acid filtrate is introduced at the rate of 3.32 t/h to a battery of extractors and treated countercurrently with 60 t/h of tri-butyl phosphate containing 4 % by weight of water. On the side where the solvent enters, 0.20 t/h of a solution containing the impurities is collected, and on the other side 63.12 t/h of extract is obtained which is neutralized to pH = 8.0 by 1.58 t/h of potassium hydroxide. The neutralization causes the formation of two phases which are separated by decantation at 25° C. A separated stream of 60 t/h of tri-butyl phosphate containing 4 % of water is recycled without cooling to the extraction stage, and 4.70 t/h of an aqueous phase is also separated, comprising a solution of monopotassium phosphate having the following composition, by weight:

| | |
|---|---|
| $P_2O_5$ | 21.3% |
| $K_2O$ | 14.2% |
| F | 0.01% |
| $Fe_2O_3$ | 0.0015% |
| $SO_3$ | 0.10% |

EXAMPLE 3

The extraction is performed at 25° C as in Example 1. In a first test, the temperature of the solvent obtained by decantation at 40° C was reduced to 25° C before recycling it to the extractor. After a week of operation, there was no thickening of raffinate. In a second test, the solvent was recycled directly. It had a temperature of 33° C on entering the extractor, and was cooled progressively in direct contact with the partially treated colder (25° C) phosphoric acid. The resultant raffinate, after only one day of operation, was so thick that it caused severe fluid-flow problems in the system.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a substantially continuous method of purifying an aqueous stream of wet process phosphoric acid, comprising the steps of solvent extracting phosphoric acid from said aqueous stream with a normally liquid organic solvent which is water miscible at 25°C. to the extent that a saturated solution of water and said solvent contains 2–30% by weight water and which solvent does not form a compound or complex with phosphoric acid which compound or complex cannot be disassociated during a subsequent reextraction step from the organic solvent, separating the organic solvent from said phosphoric acid, and recycling said solvent to the solvent extracting step, wherein the improvement comprising substantially continuously regulating the water content of said recycled organic solvent prior to the step of said solvent extracting in order to employ as said organic solvent in said solvent extracting step, a mixture of said organic solvent with about 50–60% by weight of the amount of water required to saturate the solvent at about the average temperature of said extraction process, whereby the rate of extraction is increased as compared to higher amounts of water, and the rheological properties of the liquid in the extraction step are improved as compared to lower amounts of water.

2. A process as defined by claim 1, further comprising the steps of:

separating resultant organic phase containing phosphoric acid from resultant aqueous phase containing impurities;

subjecting said resultant organic phase to reextraction with water to obtain the organic solvent saturated with water, and an aqueous phase containing purified phosphoric acid;

distilling said saturated organic solvent to remove sufficient water to recover a solvent containing 40 – 50 % of water less than the saturation water; and recycling the distilled organic solvent to the solvent extraction step.

3. A process as defined by claim 1 further comprising the steps of:

separating resultant organic phase containing phosphoric acid from resultant aqueous phase containing impurities;

subjecting said resultant organic phase to reextraction by adding an alkali thereto from a phosphoric acid salt which is transferred to the aqueous phase, and an organic solvent containing 40 – 50 % of water less than the saturation water; and recycling the latter directly to the extraction step.

4. A process as defined by claim 1 wherein said wet process phosphoric acid contains 50 – 55 % by weight $P_2O_5$ and the organic solvent is selected from the group consisting of a $C_5$ OXO alcohol (characterized by being a mixture of branched alcohols saturated with 8 % water at 25°) and ethylbutanol.

5. A process as defined by claim 1 wherein said wet process phosphoric acid contains about 20 % and the solvent is tertiary amyl alcohol.

6. A process as defined by claim 5 wherein said phosphoric acid contains about 20% by weight $P_2O_5$ and wherein said solvent is tertiary amyl alcohol.

7. A process as defined by claim 1 wherein said organic solvent is:

1. liquid at 20° – 25°C.;
2. does not form a compound or complex which cannot be dissociated during a subsequent reextraction step from the organic solvent; and
3. at 25°C. is miscible with water to the extent that a mixture of water of solvent contains 2 – 30 % by weight water at saturation.

8. A process as defined by claim 1 wherein said organic solvent is selected from the group consisting of a saturated aliphatic alcohols containing 4 to 10 carbon atoms inclusive, cyclopentanol, cyclohexanol, benzyl alcohol, ethyl acetate, isopropyl acetate, cyclohexanone, tri-butyl phosphate and phenyl ethyl alcohol.

9. A process as defined by clam 1, said extraction step being conducted at a substantially constant temperature, not decreasing more than 2°C. from the starting temperature, 10. A process as defined by claim 9 wherein the organic solvent and the wet process phosphoric acid are brought to substantially the same temperature prior to the extraction step.

11. A process as defined by claim 8, said extraction step being conducted at a subtantially constant temperature, not decreasing more than 2° C. from the starting temperature, and not increasing more than 5° C. from the starting temperature.

* * * * *